INVENTOR.
CHESTER A. SIVER

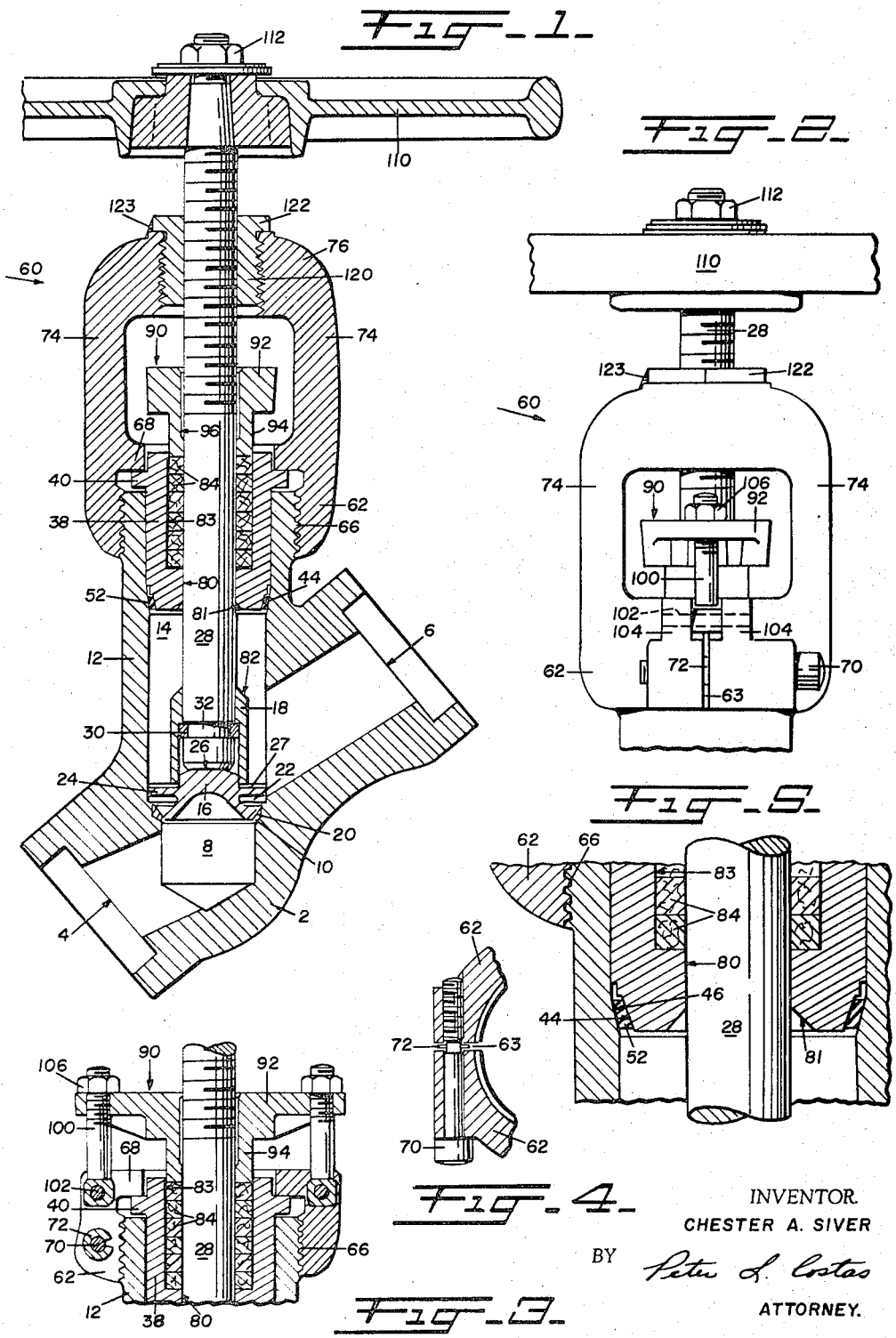

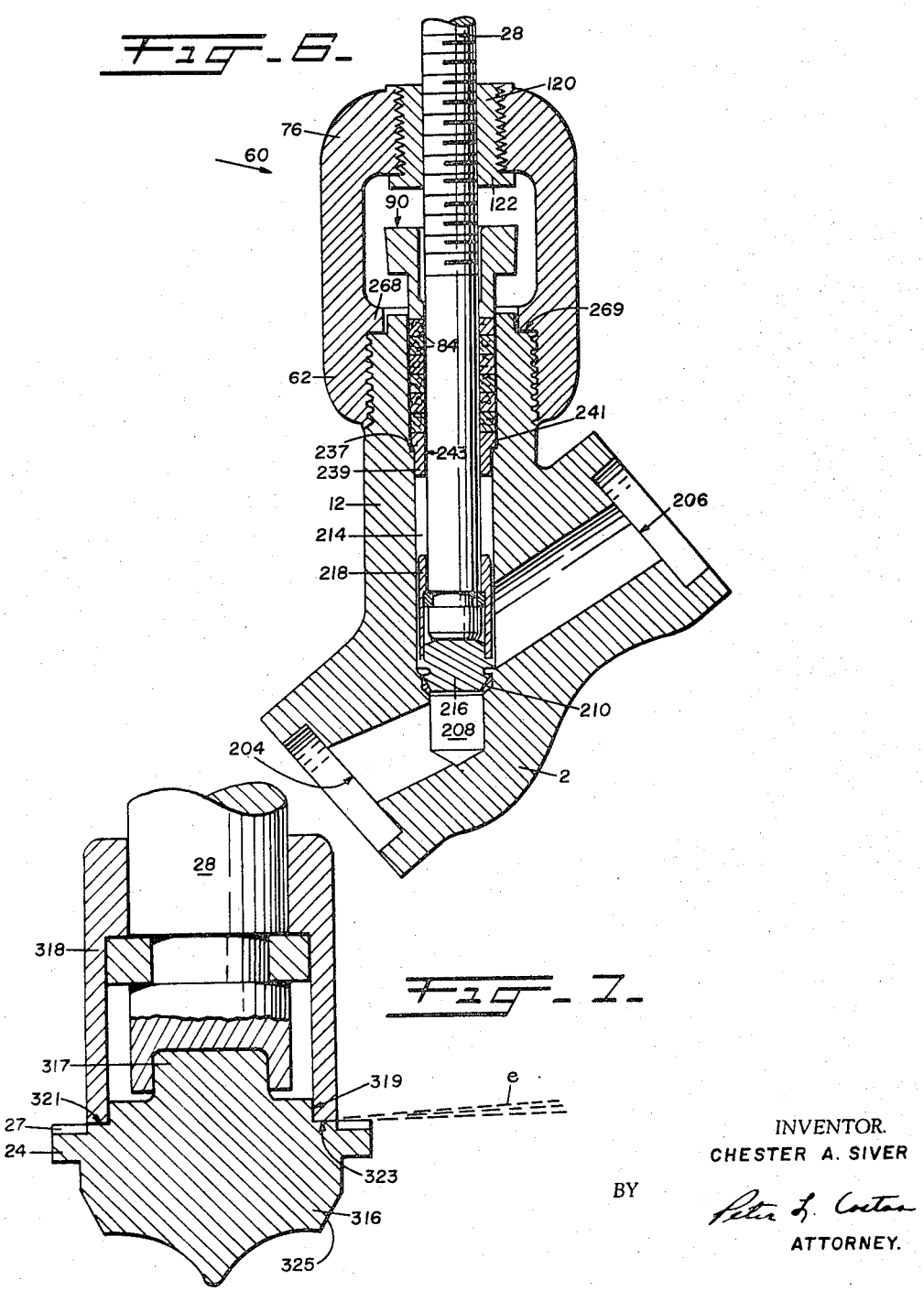

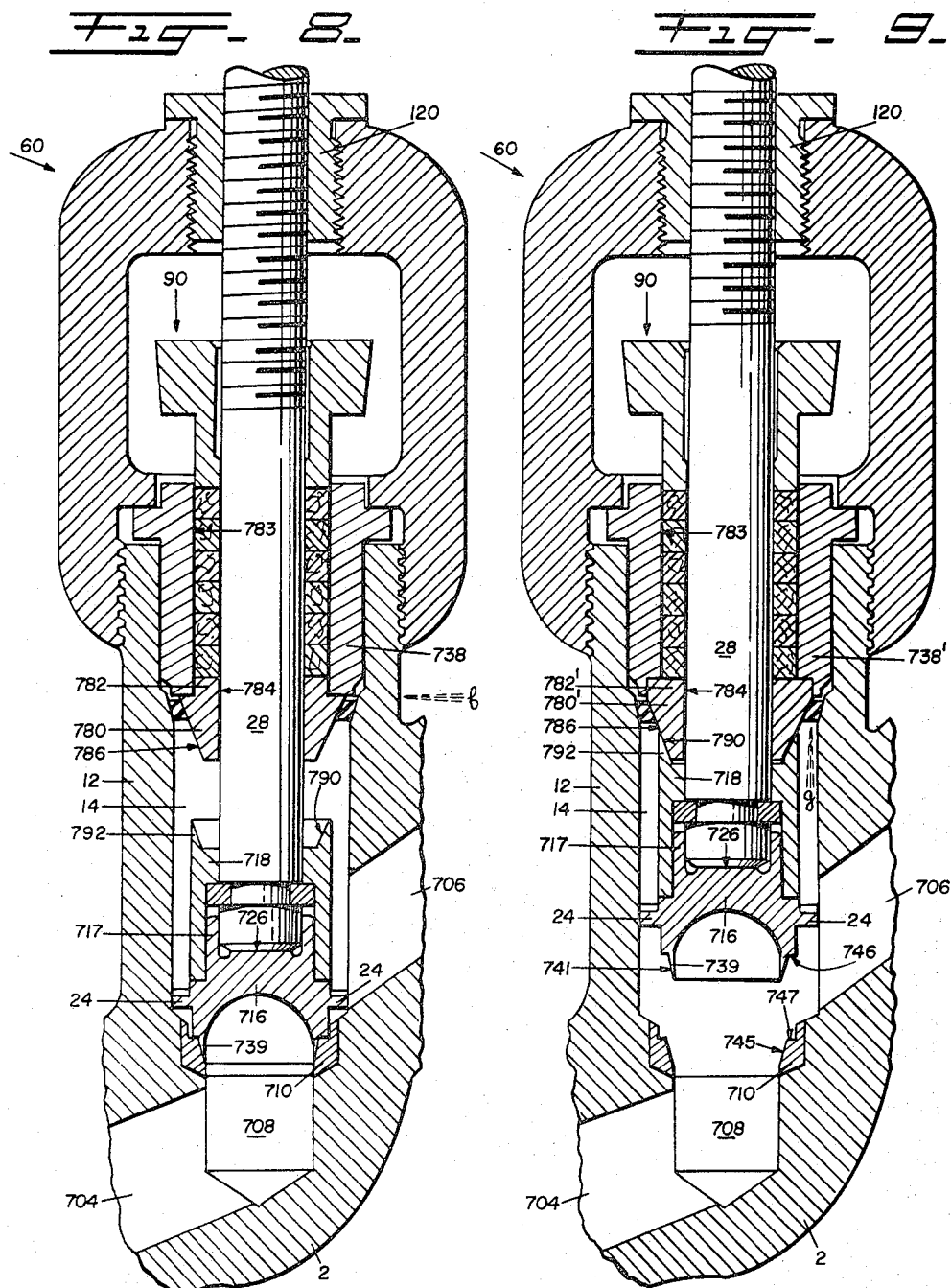

United States Patent Office 3,418,708
Patented Dec. 31, 1968

3,418,708
METHOD OF MAKING VALVES BY
ELECTRON BEAM WELDING
Chester A. Siver, Longmeadow, Mass.
(10 Fair Hill Lane, Suffield, Conn. 06078)
Original application Dec. 12, 1962, Ser. No. 244,092, now
Patent No. 3,219,311, dated Nov. 23, 1965. Divided and
this application Jan. 20, 1964, Ser. No. 338,680
10 Claims. (Cl. 29—157.1)

ABSTRACT OF THE DISCLOSURE

A first metallic valve component and a second valve component of hard, wear-resistant metallic alloy are assembled in abutting relationship with cooperatively configured and dimensioned abutting surfaces providing an annular band-like abutment area of close surface contact. A beam of high energy charged particles brackets the abutment area and is focused to weld the two components together over the abutment area without loss of the desirable properties of the metals.

---

Thte present invention relates to valves, and more specifically to an improved method for making valves particularly adapted to handling of high-pressure and/or high-temperature fluids and to the valve elements produced thereby.

This application is a division of copending application Ser. No. 244,092, filed Dec. 12, 1962 now U.S. Patent No. 3,219,311, granted Nov. 23, 1965.

In valves generally, and in high-temperature and pressure valves particularly, it is highly desirable to provide surfaces of hard, wear-resistant alloys at such areas as the seating surfaces and those surfaces subject to cavitation and corrosion such as at the throttling areas. Generally, the cost and difficulty of machining such hard, wear-resistant metallic alloys militate against the fabrication of a body member entirely therefrom in order to be economically competitive.

In the past, various methods for locally applying small quantities of hard, wear-resistant alloys in valves have been attempted, including the chill-shrinking of a hard, wear-resistant insert prior to locating in the body member and the threading of the insert into a body member. Eventually, leakage is likely to develop between the insert and body member assembled by these methods. Puddling or depositing of molten alloy in situ followed by grinding has also been proposed. Recently, use of projection welding to form a leak-proof joint between a hard, wear resistant insert and a softer metal body member has been proposed in United States Patent No. 2,903,564, granted in 1959 to Carr. However, the facile, economical and relatively trouble-free bonding of such elements has continued to be a problem and accordingly, there has been little fluidity in the scope of design using such hard, wear-resistant alloys.

Accordingly, it is the aim of the present invention to provide a method for joining a first valve component of a hard, wear-resistant metallic alloy to a second metallic valve component which is relatively facile and relatively economical wherein the insert and body member may be bonded in fluid-tight, distortion-free relationships, thus permitting relative freedom in design of hard metallic alloy components.

A related aim is to provide such a method wherein components of hard, wear-resistant metallic alloy may be prepared to close tolerance and in a wide variety of configurations and thereafter securely bonded without distortion or loss in desirable properties.

It is also an aim to provide valve elements of greatly enhanced properties produced by such a method.

Other objects and advantages will be apparent from the following detailed description and the attached drawings wherein:

FIGURE 1 is a sectional view in elevation of a valve assembly made in accordance with the present invention;

FIGURE 2 is a fragmentary elevational view of the valve of FIGURE 1;

FIGURE 3 is a fragmentary sectional view of the valve of FIGURE 1 taken at a right angle thereto;

FIGURE 4 is a fragmentary cross-sectional view illustrating a portion of the clamping structure of the clamp yoke;

FIGURE 5 is a fragmentary sectional view to an enlarged scale of the bonnet packing cartridge seal portion of the valve of FIGURE 1;

FIGURE 6 is a sectional view in elevation of another valve embodying the present invention;

FIGURE 7 is a sectional view of another embodiment of sealing means diagramatically showing the method of securing the valve disc to the disc securing member in accordance with the present invention;

FIGURE 8 is a fragmentary sectional view in elevation of still another embodiment of a valve assembly diagrammatically showing the direction of the high-energy beam for securing the back seat component to the bonnet component in accordance with the method of the present invention;

FIGURE 9 is a fragmentary sectional view in elevation of a valve assembly generally similar to that of FIGURE 8 with the valve stem in open position and with a modified back seat-bonnet assembly;

Figure 10:
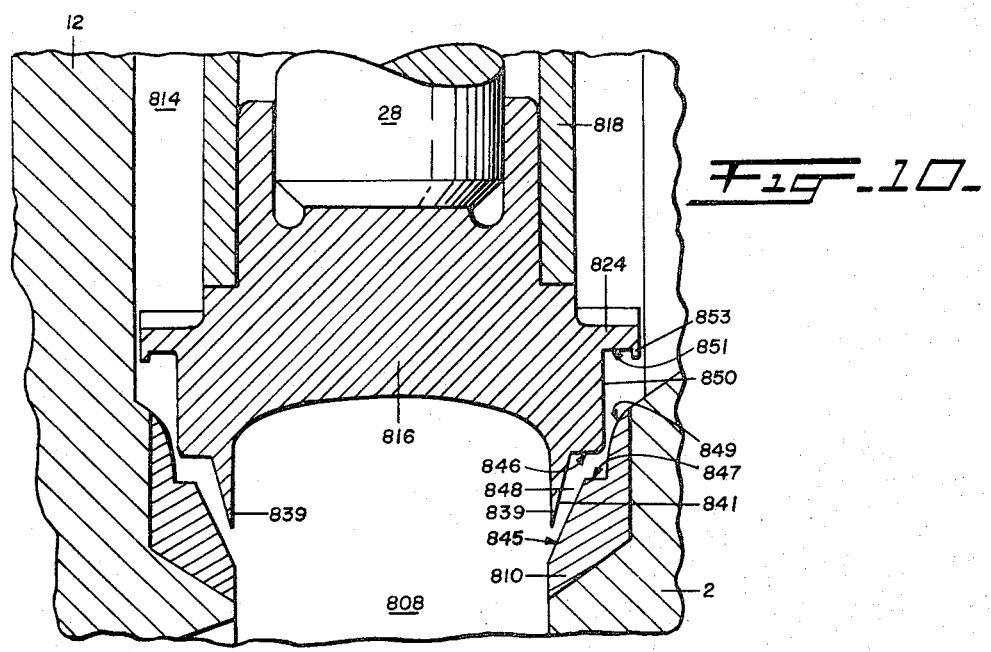
FIGURE 10 is a fragmentary sectional view in elevation to an enlarged scale of the valve disc and valve seat ring of another valve assembly.

It has now been found that the foregoing and related objects may be readily attained by a method of fabricating valves wherein there are assembled in abutting relationship a first metallic valve component and a second valve component of hard, wear-resistant metallic alloy which have cooperatively configured and dimensioned abutting surfaces to provide close surface contact therealong. The abutting surfacees of the assembled components are subjected to a focused bombardment of high-energy charged particles to weld together the abutting surfaces along a relatively narrow channel into a valve element with substantially no distortion of the components and substantially no loss in desirable properties thereof. Generally, the assembled parts are supported in a vacuum for the bombardment to minimize energy requirements for the beam of charged particles.

In this technique of welding, a beam of high-energy charged particles is focused at the abutting surfaces of the components and its intensity is regulated to form a narrow, highly heated chanel inwardly of the place of impingement. The energy density of the beam is controlled to ensure that a predetermined or certain minimum density reaches the metallic components at the place of impingement and, after this energy density has been attained, the beam will penetrate into the body of the components to a depth which is determined by the nature of the metal and the energy of the beam.

As the beam penetrates into the body of the metallic components, the charged particles simultaneously yield their energy to the metal throughout the depth of penetration to melt the metal struck by the beam and closely adjacent thereto so that the metal of the two components flows together to form a proper weld fusion along the abutting surfaces in a very narrow channel which is only slightly tapered. Advantageously, the intensity of beam energy is of a magnitude to cause complete penetration over the depth of the abutting surfaces to weld them across their entire depth. Since only a narrow channel in the assembled components is involved and the heat conductivity of the metals does not affect the weld speed, the beam may rapidly traverse the length of the abutting surfaces at comparatively high speeds and with a minimum of thermal stress in the welded parts.

The technique of welding using high-energy electrons as the charged particles is well described in patents and the literature so that further description is not considered necessary to an understanding of the present invention. Hereinafter, this beam of charged particles will conveniently be referred to simply as an "electron beam" in accordance with the prevalent commercial usage.

Although both components may be fabricated from hard, wear-resistant metallic alloy, one valve component will most usually be fabricated from a softer metal to enable economy in construction, ease in machining and fabrication, and utilization of the desirable properties of such softer metals when advantageous.

The abutting surfaces provide a closed, band-like abutment area of close surface contact which is substantially rectilinear from one margin thereof to the other to facilitate the complete welding thereover by the essentially straight-line beam of charged particles. At least one margin of the band-like abutment area must be on the exterior of or peripheral to the assembled components to provide direct, unimpeded access to the abutment area for the electron beam. Moreover, the assembled components to be melded should be configured and dimensioned so that there will be no obstructions to interfere with a surface projected rectilinearly through the exterior margin of the abutment area from the other margin thereof in order to permit the electron beam to be directed along the projected surface in alignment with the abutment area for efficient welding thereover.

The abutting surface on the softer valve components may conveniently be machined or cast as a surface of revolution and the abutting surfaces of the hard, wear-resistant metallic alloy components may be cast as a cooperatively configured and dimensioned surface of revolution by methods capable of great dimensional and configurational accuracy such as investment casting. The weld may be conveniently effected by directing the electron beam in the projected surface of revolution in alignment with a generatrix of the surface. Thus, the electron beam circumscribes the axis of the surface of revolution to weld the components together over the full periphery of the abutment area and to a depth along the abutment area which may be closely controlled to ensure firm, fluid-tight bonding therebetween.

Although cylindrical and planar abutment areas are generally preferable, conoidal abutment areas may be provided where desired as in cases where the configuration of the workpiece would interfere with the electron beam welding of cylindrical or planar abutment areas.

The method of the present invention has been particularly advantageous for bonding hard, wear-resistant metallic alloy components to softer metallic components to provide wear-resistant valve seat rings, wear-resistant valve discs or valve disc sealing surfaces, and wear-resistant back seat surfaces.

Turning now to the attached drawings in detail, FIGURES 1-5 illustrate a high pressure globe valve of the type for which the method of the present invention may be highly advantageously employed. Generally, such valves have a valve body 2 having end ports 4 and 6 joined by a through flow passage. The valve body 2 has a bonnet end extension portion 12 extending at an angle to the flow passage 8 and having a valve chamber 14 extending therethrough which communicates with the through flow passage 8. An annular valve seat ring 10, preferably of a hard, wear-resistant metallic alloy, such as Stellite alloys made by the Haynes Stellite Division of Union Carbide Corporation, is secured in the through flow passage by an electron beam weldment in a manner to be more fully described hereinafter.

The valve stem 28, which is reciprocable axially within the valve chamber 14, is provided at its inner end with means for sealing the through flow passage 8 including the valve disc member 16. The generally annular disc securing member 18 secures the valve disc 16 to the stem 28 with the end thereof bearing against the thrust surface 26 of the disc 16. The valve disc 16 preferably is integrally formed from a single element of a hard, wear-resistant metallic alloy, conveniently by investment casting, and has a circumferential seating surface 20 cooperating with valve seat ring 10 to form a seal in the through flow passage 8. The valve disc 16 also has a peripheral recess 22 for effecting a saving in weight and material and a peripherally extending guide flange portion 24 spaced axially from the seating surface 20. The upper surface of the flange portion 24 is provided with tool-engaging slots 27 for engagement by a tool inserted into the outer end of the chamber 14 to rotate the disc 16 during lapping. The disc-securing member 18 is secured to the disc 16 by an electron beam weldment as will be described hereinafter and is secured to the inner end of the valve stem 28 by the split ring 30 seated in the groove 32 in the valve stem 28 which abuts against an inner radially extending, annular shoulder. The disc retaining member also has a generally conical back-seat sealing surface 82 at its outer end for a purpose to be described hereinafter.

Threadably engaged upon the outer surface of the bonnet end extension portion 12 of the valve body 2 is the clamp yoke 60 having a lower split ring portion 62 and an upper ring portion 76 joined by a pair of vertical yoke arms 74. The lower split ring portion 62 has a threaded axial aperture 66 therethrough which threadably engages with threads on the bonnet end extension portion 12. When the clamp yoke 60 has been drawn down sufficiently upon the valve body 2, the clamp bolt 70, tangentially traversing the split 63 in the split ring portion 62, is tightened to close the gap or split 63 and draw the split ring portion 62 rightly about the valve body 2, thereby quickly but firmly locking or clamping the clamp yoke 60 to the valve body 2. As seen in FIGURES 2 and 4, the snap ring 72, which is held within the split 63 by the bolt 70, expands upon loosening of the bolt 70 to aid in widening the split 63 upon disassembly and thus to facilitate the removal of the clamp yoke 60 from the valve body 2. The lower split ring portion 62 also has two diametrically spaced pairs of lugs or bosses 104, and an inwardly radially projecting bonnet retaining flange 68 spaced above the threaded portion 66, all for purposes to be described hereinafter.

The upper ring portion 76 has a threaded aperture therein threadably seating the generally annular yoke bushing 120 which is tightened therein until the flange 122 thereon abuts against the upper surface of the upper ring portion 76. To lock the bushing 120 against inadvertent rotation relative to clamp yoke 60, a tack weld is desirably provided as indicated by the numeral 123.

The central aperture through the annular bushing 120 is threaded for adjustable engagement with the threaded upper portion of the valve stem 28. Rotation of the hand wheel 110, which is locked upon the upper end of the valve stem 28 by the lock nut 112, causes the valve stem 28 to reciprocate axially relative to the bushing 120 and thereby the valve body 2 and the through flow passage 8 in opening and closing the valve.

The outer end of the valve chamber 14 is covered by a bonnet assembly 38 having a bonnet packing cartridge portion with an axially extending cylindrical recess 83 opening at the outer end thereof and a generally conical bonnet sealing surface portion 44 extending circumferentially about its inner end and tapering inwardly to a reduced diameter at the innermost end. The inner wall of the bonnet end extension 12 defining the valve chamber 14 has a cooperatively configured and dimensioned, generally conical sealing surface portion 46 similarly tapering to the reduced diameter at its inner end. The bonnet assembly sealing surface portion 44 has an angle of taper relative to the axis of reciprocation of the valve stem 28 slightly greater than the corresponding angle of taper of the generally conical bonnet sealing surface 46 to provide an annular gap therebetween diverging inwardly of the valve chamber 14. An annular float ring seal or gasket 52 of suitable elastically deformable material is wedged in the annular gap during the seating of the bonnet assembly 38. Fluid pressure within the valve chamber 14 tends to force the float ring seal 52 even more tightly into the annular gap to provide an excellent high-pressure seal between the bonnet assembly 38 and the valve body 2.

The bonnet assembly 38 also has a back-seat portion at its inner end with an annular, generally conical seating surface 81 dimensioned and configured to cooperate with the aforedescribed seating surface 82 on disc securing member 18 to provide a seal about the valve stem opening 80 in the bonnet assembly 38 when the valve is opened.

The bonnet assembly 38 also is provided with a radially outwardly extending annular flange 40 adjacent the outer end thereof which is tightly clamped between the upper surface of the bonnet end extension 12 of the valve body 2 and the radially inwardly extending bonnet retaining flange 68 on clamp yoke 60 during the lowering of yoke 60 upon the valve body 2 to lock the bonnet assembly onto the valve body 2. Thus, the bonnet assembly 38 may be rapidly and easily removed from or engaged with the valve body 2 by the facile and speedy removal or engagement of the clamp yoke 60 upon the valve body 2. The axially extending cylindrical recess 83 of the bonnet packing portion of the bonnet assembly 38 receives packing material such as the packing rings 84 which provide an annular seal about the valve stem 28 as it extends therethrough.

Slidably mounted on the valve stem 28 upwardly of the bonnet assembly 38 is a gland 90 having a cylindrical bushing portion 94 of reduced diameter at its lower end dimensioned to fit snugly with the recess 83. The axial aperture 96 in the gland 90 through which the valve stem 28 projects should be dimensioned sufficiently larger to minimize any binding forces upon the stem 28 and desirably has its outer portion of enlarged diameter to minimize the likelihood of possible galling or locking upon the threaded portion of the stem 28. Adjacent its outer end, the gland 90 has a radially outwardly extending flange 92 with diametrically opposed extension portions or ears which extend radially outwardly above the aforementioned bosses 104 of the lower split ring portion 62, as best seen in FIGURE 3. A pair of gland bolts 100 are pivotally mounted at their lower ends on gland bolt pins 102 which, in turn, are journaled between the pairs of bosses 104. The gland bolts 100 extend freely upwardly through apertures in the extension portions of gland flange 92 and gland bolt nuts 106 are tightened upon the bolts 100 to urge the gland bushing portion 94 into the recess 83 of the bonnet assembly 38 and thus to compress the material of the packing rings 84 about the valve stem 28 in the recess 83. In this manner, the bolt nuts 106 may be "walked down" substantially uniformly upon their respective gland bolts 100 to effect the desired inward movement of the gland 90.

Turning now to FIGURE 6, therein is illustrated an alternate bonnet and yoke bushing construction in a valve assembly having a valve body 2 similarly having end ports 204, 206 connected by through flow passage 208 and a bonnet end extension portion 12 with a valve chamber 214 communicating with the through flow passage 208 in which is secured a seat ring 210. As in the previous embodiment, the valve stem 28 reciprocates within the valve chamber 214 and has mounted on its inner end sealing means including a valve disc member 216 adapted to form a sealing engagement with valve seat ring 210 and secured to the valve stem 28 by disc securing member 218.

In this embodiment, the valve chamber 214 is covered by the loose back-seat and bonnet member 239 which is entirely disposed within the valve chamber 214 and has a radially outwardly extending shoulder 241 engaged with the radially inwardly extending annular shoulder 237 on the inner wall of the valve body 2 defining the valve chamber 214 to limit its inward movement. Bonnet member 239 is provided with axial aperture 243 through which the valve stem 28 reciprocates and packing rings 84 of suitable material are received within the valve body 2 outwardly of the back seat member 239.

Clamp yoke 60 is threadably engaged with valve body 2 as described hereinbefore, with the radially inwardly projecting flange 268 engaging the annular shoulder 269 on valve body 2 to limit the movement of yoke 60 onto the body. Gland 90 is adjustably secured to the yoke 60 as described for the embodiment of FIGURES 1–5 to compress the packing rings 84 against the loose back seat member 239. In this embodiment, the yoke bushing 120 is inverted with the radially outwardly extending flange portion 122 bearing against the inner surface of upper ring portion 76 of yoke 60. In this manner, the flange transmits to the upper abutting surface of the ring portion 76 of the clamp yoke 60 substantially the full load of the thrust developed in reciprocating the valve stem 28 inwardly to close the valve, thus relieving the threads of bushing 120.

Although the back-seat 239 may be welded to the wall of the valve body 2 or threadably engaged therewith, the loose arrangement illustrated will be generally satisfactory for intended applications. It will be readily appreciated that the loose back-seat of this embodiment does not permit repacking under pressure as in the previous embodiment.

FIGURE 7 diagrammatically illustrates the application of the method of the present invention to the fabrication of an alternative disc structure. A valve disc 316 made from a hard, wear-resistant metallic alloy is assembled in abutting relationship with the metallic disc retaining member 318. The disc surface 321 abuts against the cooperatively configured and dimensioned retaining member surface 323 to provide close surface contact over an annular band-like abutment area which is coaxial with and lies substantially in a plane perpendicular to the axis of reciprocation of the valve stem 28 and which has one margin thereof lying on the periphery of the assembled components.

The assembled disc 316 and retaining member 318 are preferably supported in a high vacuum adaptable to electron beam welding, and the abutting surfaces 321, 323 are subjected to a focused bombardment of high-energy electrons, in a beam indicated by the letter $e$, to weld together the abutting surfaces in a relatively narrow channel and over substantially the entire depth thereof with substantially no distortion of the disc 316 and retaining member 318, and substantially no loss of desirable properties thereof.

As seen in FIGURE 7, the band-like abutment area is substantially rectilinear from one margin thereof to the other. The beam $e$ is directed along the surface which has been projected rectilinearly from the inner margin of the abutment area through the outer or peripheral margin to permit the focused, substantially rectilinear beam $e$ to weld efficiently over substantially the full abutment area.

When the disc 316 and retaining member 318 are configured and assembled as illustrated with abutment area lying in essentially a surface of revolution, the assembled components may be rotated about the axis of the surface of revolution, which in this case coincides with the axis of reciprocation of the valve stem 28, for convenient and accurate welding of the full abutment area by the beam e emanating from a fixed source.

In the illustrated embodiment, the disc 316 has a generally annular sealing surface 325 at its inner end and an axially extending cylindrical portion 317 at its outer end which snugly seats within a complemented axial recess in the inner end of valve stem 28, thereby centering the disc 316 upon the valve stem 28 and substantially preventing rocking therebetween. Disc retaining member 318 similarly encompasses shoulder 319 of disc 316, and a disc guide flange 24 and tool engagement means 27 are also provided.

Turning now to the embodiment of FIGURES 8 and 9, therein are illustrated valves having an alternative bonnet assembly construction providing a separately formed back-seat portion cooperating with the disc securing member to provide a highly effective seal as well as a preferred valve disc and seat ring construction. The body 2 similarly has end ports 704, 706 connected by the through flow passage 708 in which is seated the valve seat ring 710. The inner end of the valve stem 28 seats within the stem receiving axial recess defined by stem guide portion 717 and stem thrust surface 726 in the outer end of the valve disc 716. At its inner end, the valve disc 716 is provided with an annular sealing lip 739 having a generally conical sealing surface 741 extending circumferentially about the outer periphery thereof which makes surface contact with generally conical sealing surface 745 of valve seat ring 710 to seal the through flow passage 708. The angle of taper of the disc sealing surface 741 relative to the axis of reciprocation of the valve stem 28 is normally slightly less than that of the ring sealing surface 745 to produce radial or transverse deflection upon movement thereagainst and thereby provide stressed, fluid-tight sealing engagement therebetween. This is enhanced by pressure of fluid acting against the inner peripheral surface of the lip 739. To limit the inward movement of the valve disc 716 and thereby avoid excessive deflection, the disc has a radial shoulder 746 which abuts against a radial shoulder 747 on the ring 710. The disc 716 also has a radial disc guide flange 24 extending about its circumference to minimize wobbling during movement between open and closed positions.

In this embodiment, the valve disc 716 is secured to the inner end of valve stem 28 by a disc retaining member 718 which has at its outer end an annular back-seat sealing lip 792 providing a generally conical sealing surface 790 on the inner periphery thereof which tapers to a reduced diameter at its outer end. Preferably, the valve disc 716 is formed of a hard, wear-resistant metallic alloy and is secured to the disc retaining member 718 by an electron beam weldment.

The valve chamber 14 is covered by a bonnet assembly having a generally cylindrical bonnet packing cartridge portion 738 with a radially outwardly extending flange and a generally circular back-seat portion 780 at its inner end having an outwardly projecting cylindrical portion 782 snugly received in the bore 783 of the bonnet packing cartridge portion 738. The back seat component 780 is fabricated from a hard, wear-resistant metallic alloy and is assembled in abutting relationship with the bonnet packing cartridge component 738. In the embodiment of FIGURE 8, the two components have cooperatively configured and dimensioned abutting surfaces providing an annular, band-like abutting area lying substantially in a plane perpendicular to the axis of reciprocation of the valve stem 28 and to the axis of the apertures 783, 784 therein. Prior to assembly with the other valve elements, the two assembled components 738 and 780 are preferably supported in a relatively high vacuum and the abutment area is subjected to a focused bombardment of high-energy electrons in beam f to weld together the two abutting surfaces and form the complete bonnet assembly with substantially no distortion of the two components 738, 780 and substantially no loss of the desirable properties thereof.

The abutment area is substantially rectilinear from one margin thereof to the other, and the two components 738, 780 are designed to permit the beam f unimpeded access to the peripheral margin of the abutment area in the plane thereof. The resulting assembly is accurately dimensioned, undistorted, strong and fluid-tight, and the axial aperture 784 through the back-seat portion 780 provides a hard, wear-resistant stem guide surface for the valve stem 28.

The back-seat portion 780 is configured to provide a generally conical sealing surface 786 extending circumferentially about its outer periphery which tapers to a reduced diameter at the inner end thereof. The sealing surface 786 adjacent its outer end cooperates with a generally conical surface on the adjacent portion of the inner wall of the valve body 2 defining the valve chamber 14 to provide an annular, wedge-shaped gap therebetween within which an annular float ring seal is seated and forced into tight sealing engagement by fluid pressure in the valve chamber as described earlier with respect to the embodiment of FIGURES 1–5.

When the valve stem 28 is reciprocated outwardly to open the through flow passage 708 as seen in FIGURE 9, the conical sealing surface 790 of the sealing lip 792 of the disc retaining member 718 abuts against the conical surface 786 of the back-seat portion 780 and cooperates therewith to provide a back-seat seal about the valve stem 28. The disc sealing surface 790 has an angle of taper or included angle relative to the axis of valve stem reciprocation normally slightly less than the corresponding angle of taper or included angle of the sealing surface 786 of the back-seat surface 780 and is transversely or radially deflectable within the elastic limit of the material by movement against the back-seat sealing surface 786 to provide stressed fluid-tight sealing engagement therewith. The pressure of fluid against the outer peripheral surface of the sealing lip 792 provides transverse or radially deflecting pressure upon the sealing lip 792 against the back-seat portion 780 to enhance the sealing engagement of the sealing surface 790 with the sealing surface 786.

In FIGURE 9, the bonnet assembly has been modified from that of FIGURE 8 by providing a generally cylindrical abutment area with the cylindrical portion 782' at the outer end of back seat component 780' snugly received in a counterbore formed in the inner end of the bonnet packing cartridge component 738'. One margin of the abutment area lies on the exterior of the assembly at the inner end of the bonnet packing cartridge component 738' and is exposed to focused bombardment of high-energy electrons as indicated by the beam g prior to assembly with the other valve elements. In this embodiment, the abutment area is cylindrical and the beam is directed parallel to the axis of the apertures 783, 784 in the components. However, in the embodiments of both FIGURE 8 and FIGURE 9, the abutment area is formed as a surface of revolution coaxial with the stem guide aperture 784 and bonnet cartridge portion bore 783.

Figure 11:
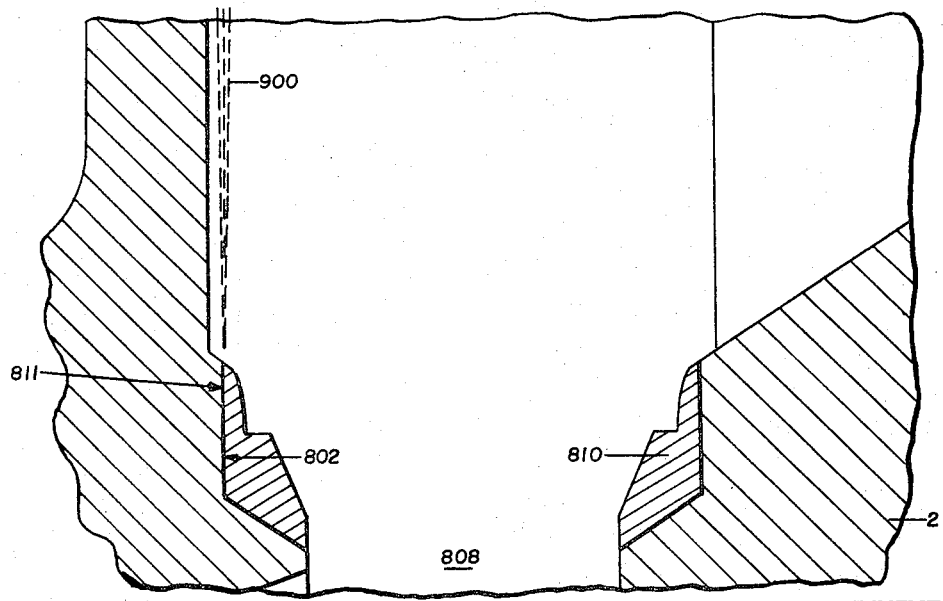
FIGURE 11 is a view similar to that of FIGURE 10 with the valve disc and stem removed diagrammatically showing the method of securing the valve seat ring to the valve body in accordance with the present invention.

Referring now to FIGURES 10 and 11, therein is illustrated another embodiment of valve seat ring 810 and valve disc 816 similarly formed of hard, wear-resistant metallic alloy. The securing member 818 secures the disc 816 to the end of valve stem 28 for reciprocation in the valve chamber 814 in the bonnet end extension 12 of the valve body 2. The circumferential guide flange portino 824 of disc 816 has an annular deflecting lip 853 depending from the periphery thereof to protect the body wall 2 from impingement by and the corrosive effects of high pressure-high temperature fluids deflecting from the wear-resistant surface 851 during throttling of the valve. The disc 816 has a generally cylindrical disc wall portion 850 which cooperates with the outwardly diverging body wall portion 849 of the hard, wear-resistant metallic alloy seat ring 810 to provide a diverging, annular throat 848 which performs the major throttling action of the stream as the valve is opened and closed. At its inner end, the valve disc 816 is provided with an annular sealing lip 839 having a generally conical sealing surface 841 extending circumferentially about the outer periphery thereof which makes surface contact with generally conical sealing surface 845 of valve seat ring 810 to seal the through flow passage 808. The angle of taper of the disc sealing surface 841 relative to the axis of reciprocation of valve stem 28 is normally slightly less than that of the ring sealing surface 845 to produce radial or transverse deflection upon movement thereagainst and thereby to provide stressed, fluid-tight sealing engagement therebetween. This is enhanced by pressure of fluid acting against the inner peripheral surface of the lip 839. To limit the inward movement of the valve disc 816 and thereby avoid excessive deflection, the disc has a radial shoulder 846 which abuts against radial shoulder 847 on the ring 810.

The method of bonding the seat ring 810 in the through flow passage 808 is diagrammatically illustrated in FIGURE 11. The seat ring 810 is snugly received in an annular ring-receiving recess at one end of the through flow passage 808 defined by the inner wall of the valve body 2. The recess has an abutting surface 802 which is configured and dimensioned to cooperate with the abutting surface 811 of the seat ring 810 to provide close surface contact over a generally cylindrical abutment area. As shown, the diameter of the valve chamber 814 defined by the inner wall of the valve body 2 is larger than that of the seat ring 810 and recess to permit unimpeded access of a high-energy electron beam 900 to the abutmnet area along a plane defined by the abutment area and the inner wall of the body 2 is free from obstructions which would interfere with the beam directed towards the abutment area from the end of the body adjacent the recessed end of the through flow passage 808. If desired, the abutment area defined by the recess and ring may be conoidal rather than cylindrical as shown albeit with greater difficulty since the inner wall of the valve body 2 must be configured and dimensioned to provide unobsrtucted projection of the abutment area through the valve chamber to the end of the valve body adjacent the recessed end of the through flow passage for unimpeded access of an electron beam. The electron beam 900 is directed generally parallel to the axis of the through flow passage 808 and circumscribes the outer or peripheral margin of the abutment area to use the two abutting surfaces 802, 811 together with substantially no distortion of the components.

Electron beam welding is ideally suited to the assembly of hard, wear-resistant metallic alloy components to components of softer metal in the manufacture of valve elements. The electrons of the beam are generated by suitable cathodes and accelerated by high voltages. The electrons are then focused electrostatically or magnetically to provide an extremely narrow range of heating in the workpiece. Generally, it is considered that the electrons pass through a region of low density metal vapor formed by the intense heat produced in the exceptionally localized area where the beam strikes the workpiece, and the vapor ionizes to refocus the beam and reduce electron scattering.

The great accuracy and extremely localized area of weld provided by electron beam welding permit the joining of components of small size and of complex configuration with substantially no distortion and with no cracking of hard, wear-resistant alloy components.

The method of the present invention produces virtually no contamination of the resultant valve element and little if any thermal stresses are generated by the extremely localized heating enabled by the precise control of the intensity and location of the beam as well as the total heat and heat concentration. Moreover, dissimilar metals with relatively widespread melting points may be welded without significant heat distortion or loss in properties due to excessive heating because of the localized application of only that energy necessary to effect fusion along the narrow zone of the abutment areas.

Since comparatively small amounts of energy are required to produce fusion in the narrow weld area, the process may be effected at relatively high speeds and with a minimum of unacceptable assemblies. The components may be precision formed with abutting surfaces preshaped by machining, grinding or casting to provide a clearance therebetween sufficient for assembly but less in width than the intended channel of fusion. The welding process produces a small substantially parallel sided or slightly tapered weld zone wherein the abutting surfaces are bracketed by a beam of highest power density (i.e., power per unit of impingement area). The resultant fusion area provides a strong, fluid-tight bond even between dissimilar metallic substances and the technique avoids the introduction of contaminant fluxes, weld metals or brazing compounds.

Thus, it can be seen that the present invention provides a method for fabricating valve elements wherein valve components of hard, wear-resistant metallic alloy are bonded to other metallic valve components without distortion and loss in desirable properties of the components. The method is relatively facile and relatively economical and provides a fluid-tight seal or bond therebetween. This method permits relative freedom in design of hard, wear-resistant metallic alloy components and the preforming thereof to a variety of configurations and to close tolerances so as to provide long-lived and rugged valve constructions.

Having thus described the invention, I claim:

1. In the method of providing a valve body assembly having a wear-resistant valve disc seating surface, the steps comprising: forming a valve body with a through flow passage therein and a valve chamber extending at an angle from said through flow passage and opening on the exterior of said valve body and providing said valve body with an annular ring receiving recess portion in said through flow passage, said annular ring receiving recess portion and valve chamber being formed with cooperating dimensions and configuration to permit extension of the generatrix of the circumferential surface of said ring receiving recess portion outwardly of said opening of said valve chamber without obstruction; forming a valve seat ring of hard, wear-resistant metallic alloy in an annular configuration with an outer radius and circumferential surface closely conforming to the radius and configuration of said circumferential surface of said ring receiving recess portion; assembling said valve seat ring in said ring receiving recess portion to provide an annular band-like abutment area of close surface contact along said circumferential surfaces, said abutment area being substantially rectilinear; and bracketing said abutment area by a beam of highest power density of high-energy charges particles focused through said opening of said valve body at said abutting surfaces and moving said beam and assembly of said seat ring and valve body relative to each other to weld together said ring and valve body over said abutment area by forming a small substantially parallel sided or slightly tapered weld zone and with substantially no thermal distortion of the body and ring and substantially no loss of the desirable properties of the metals thereof.

2. The method of claim 1 wherein said ring receiving recess portion is formed coaxial with said valve chamber.

3. The method of claim 1 wherein said band-like abutment area is substantially cylindrical and the inner wall of said valve body defining said valve chamber has a diameter larger than the diameter of said ring receiving recess portion to permit focusing of said beam of high-energy charged particles parallel to the axis of said valve chamber and wherein said relative movement is about an axis coaxial with the axis of said valve chamber.

4. In the method of providing a wear-resistant disc and stem assembly in a valve assembly, the steps comprising: forming a valve disc of hard, wear-resistant metallic alloy with an annular sealing surface portion adjacent one end thereof and a substantially rectilinear, annular sealing surface portion adjacent the other end thereof extending in a plane relative to the axis of said disc to the exterior surface thereof; forming a metallic disc-securing member with a coaxial aperture therein at one end for securing a valve stem extending coaxially thereinto and an annular sealing surface adjacent the other end thereof, said sealing surface being substantially rectilinear and extending in a plane to the exterior surface thereof and conforming substantially to the plane of the sealing surface of said disc; forming a valve stem; assembling said valve stem in said coaxial aperture of said disc-securing member and said disc-securing member with said valve disc to provide a coaxial assembly thereof and an annular band-like abutment area of close surface contact at said sealing surfaces thereof; said band-like abutment area being substantially rectilinear from one margin thereof to the other and extending in a plane to the exterior surface of the assembly; and bracketing said abutment area by a beam of highest power density of high-energy charged particles focused at said abutting surfaces and moving said beam and assembly relative to each other to weld together said valve disc and disc-securing member over said abutment area by forming a small substantially parallel sided or slightly tapered weld zone and with substantially no thermal distortion of said valve disc and disc-securing member and substantially no loss of the desirable properties of the metals thereof.

5. The method of claim 4 wherein said band-like abutment area lies in a surface of revolution having an axis substantially coinciding with the axis of said disc and wherein said beam of charged particles is directed along a plane coinciding therewith.

6. The method of claim 4 wherein said band-like abutment area lies substantially in a plane perpendicular to the axis of said disc and wherein said beam of charged particles is directed in said plane.

7. In the method of fabricating a bonnet assembly having a wear-resistant annular portion for disposition within the valve chamber of a valve body, the steps comprising; forming a back seat component of hard, wear-resistant metallic alloy and generally circular cross section with an aperture extending coaxially therethrough for slidably receiving an associated valve stem and with an annular back seat portion adjacent one end thereof and an annular rectilinear sealing surface spaced from said back seat portion and extending to the exterior surface of said back seat component; forming a second metallic component of generally circular cross section with an aperture extending coaxially therethrough for slidably receiving the valve stem and an annular rectilinear sealing surface adjacent one end thereof extending to the exterior surface of said second component, said second component being formed with its rectilinear sealing surface conforming substantially to the configuration of said rectilinear sealing surface of said back seat component; assembling said back seat component and second metallic component with their apertures coaxially aligned and their sealing surfaces abutting to provide an annular band-like abutment area of close surface contact extending substantially rectilinearly to the exterior surface of the assembly thereof; and bracketing said abutment area by a beam of highest power density of high-energy charged particles focused at said abutting surfaces and moving said beam and assembly relative to each other to weld together said back seat component and second metallic component over said abutment area by forming a small substantially parallel sided or slightly tapered weld zone and with substantially no thermal distortion of said back seat component and said second metallic component and substantially no loss of the desirable properties of the metals thereof.

8. The method of claim 7 wherein said band-like abutment area lies in a surface of revolution coaxial with said apertures of said components.

9. The method of claim 7 wherein said band-like abutment area lies substantially in a plane perpendicular to the axis of said apertures of said components and wherein said beam of charged particles is directed in said plane.

10. The method of claim 7 wherein said band-like abutment area is substantially cylindrical and coaxial with the axes of said apertures and wherein said beam of charged particles is substantially parallel to the axes of said apertures.

References Cited

UNITED STATES PATENTS

| 1,987,784 | 1/1935 | McDonald | 29—156.7 |
| 2,632,624 | 3/1953 | Giauque | 29—157.1 X |
| 2,887,295 | 5/1959 | Bredtschneider et al. | 29—157.1 X |
| 2,903,564 | 9/1959 | Carr | 29—157.1 X |
| 2,932,720 | 4/1960 | Stohr. | |
| 2,987,610 | 6/1961 | Steigerwald. | |
| 3,185,815 | 5/1965 | Anderson. | |

OTHER REFERENCES

Burton and Matchett; Electrons Shot from Guns Make High-Purity Welds," American Machinist, vol. 103, Feb. 23, 1950, pp. 95–98.

Moore, T. A.; "The Electron Beam as a Production Tool," Hamilton Standard, Windsor Locks, TP 61–15, paper presented Dec. 6 and 7, 1961, pp. 11–15.

JOHN F. CAMPBELL, *Primary Examiner.*

PAUL M. COHEN, *Assistant Examiner.*

U.S. Cl. X.R.

29—498; 219—121